United States Patent [19]

Sorensen et al.

[11] Patent Number: 5,085,611
[45] Date of Patent: Feb. 4, 1992

[54] AMUSEMENT DEVICE FOR A WHEEL

[75] Inventors: Gerald R. Sorensen, Elgin; Raymond J. Gradecki, Mundelein; Daniel J. E. Finkiewicz, Elk Grove Village, all og, Ill.

[73] Assignee: NCM International, Inc., Arlington Heights, Ill.

[21] Appl. No.: 583,872

[22] Filed: Sep. 17, 1990

[51] Int. Cl.⁵ .................. A63H 5/00; A63H 1/28; B62J 3/00
[52] U.S. Cl. .................. 446/216; 446/265; 446/404; 446/203; 280/288.4
[58] Field of Search ............... 446/202, 203, 204, 205, 446/206, 207, 208, 213, 214, 215, 216, 265, 404, 409; 280/1.14, 304.2, 288.4, 304.5; 116/137 R, 147

[56] References Cited

U.S. PATENT DOCUMENTS

| 38,174 | 3/1869 | Johnson | 446/409 |
|---|---|---|---|
| 201,345 | 3/1878 | Harrison | 446/213 |
| 337,497 | 3/1886 | Holbrook | 446/214 |
| 1,143,867 | 6/1915 | Thompson | 446/214 |
| 1,613,896 | 1/1927 | Lees | 446/214 |
| 2,464,338 | 3/1949 | Morris | 280/1.14 |
| 2,914,886 | 12/1959 | Barthel | 446/404 |
| 3,054,216 | 9/1962 | Testo | 446/208 |
| 3,131,506 | 5/1964 | Fox | 446/214 |
| 3,391,487 | 7/1968 | Beaubien | 446/404 |
| 4,021,963 | 5/1977 | Kingswell | 446/216 |
| 4,211,031 | 7/1980 | Gambino | 446/208 |
| 4,950,201 | 8/1990 | Sceery | 446/207 |

*Primary Examiner*—Danton D. DeMille
*Attorney, Agent, or Firm*—Wallenstein, Wagner & Hattis, Ltd.

[57] ABSTRACT

An amusement device for a bicycle wheel is disclosed. According to the present invention, the amusement device comprises a whistle, and a means for attaching the whistle to the wheel such that when the wheel rotates, wind passes through the whistle and produces a sound audible to a human ear. The present whistle 10 is a reversible whistle because it will produce a noise when air flows into the whistle from two different directions. The present invention is a double whistle because it funnels air from one direction into two separate whistle elements. The whistle 10 is also a double reversible whistle 10 because it can funnel air into two different whistle elements with air flowing in two different directions.

15 Claims, 2 Drawing Sheets

AMUSEMENT DEVICE FOR A WHEEL

TECHNICAL FIELD

The present invention relates generally to amusement devices for wheels, and specifically to a whistle that mounts to a bicycle wheel.

BACKGROUND ART

Amusement devices for bicycle tires and wheels are well known in the art. Typically, amusement devices for bicycle wheels consists of decorative material interlaced through the spokes, or reflective material mounted on the spokes, or noise making devices such as playing cards or balloons that mount on the fork of the bicycle and extend into the path of the moving spokes to produce a noise as the wheel rotates. These amusement devices increase the enjoyment of riding bicycles, especially for the younger riders.

SUMMARY OF THE INVENTION

Accordingly, the present invention provides an amusement device for a wheel. According to the present invention, the amusement device comprises a whistle, and a means for attaching the whistle to the wheel such that when the wheel rotates, wind passes through the whistle and produces a sound audible to a human ear.

Another aspect of the present invention provides a double whistle. The double whistle provides two wind scoops that guide a flow of air through two different whistle elements into a single resonance chamber.

Another aspect of the present invention provides a reversible whistle. The reversible whistle produces an audible sound in both a first direction and a second direction opposite the first direction.

Another aspect of the present invention provides a double reversible whistle. A double reversible whistle provides two wind scoops that guide air flowing in a first direction into a first and second whistle element on a single resonance chamber to produce an audible sound, and another two wind scoops that guide the flow of air in a second direction, opposite the first direction, into the first and second whistle elements on the resonance chamber to produce an audible sound.

DETAILED DESCRIPTION

Figure 1:
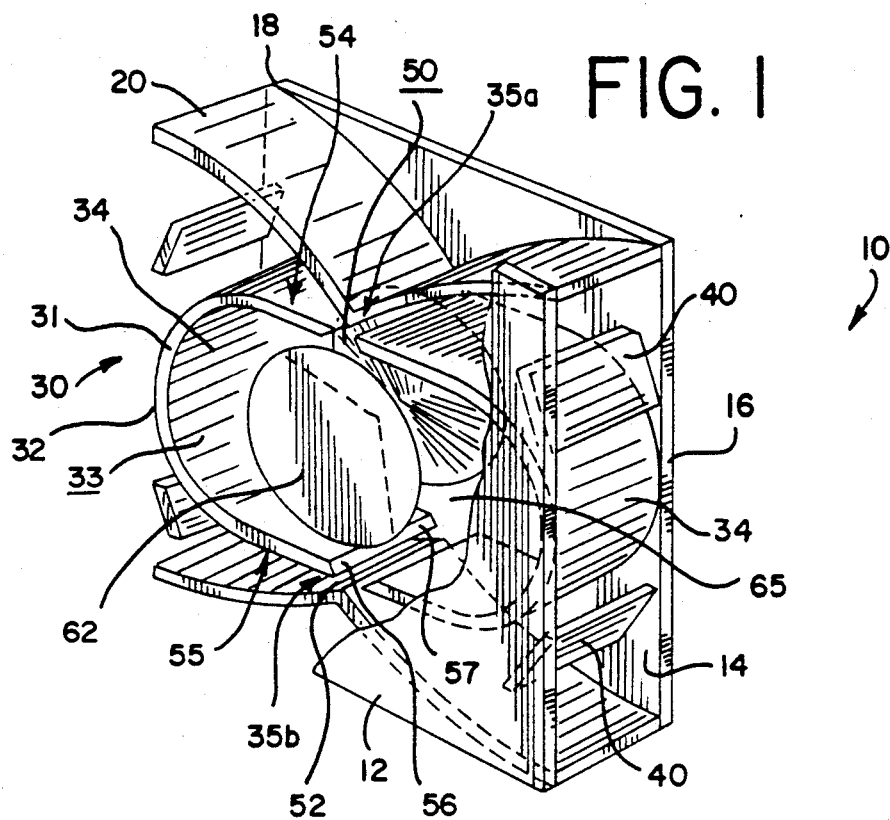
FIG. 1 shows a perspective view of the present invention with a front plate partially cutaway.

While this invention is susceptible of embodiment in many different forms, there is shown in the drawings and will herein be described in detail a preferred embodiment of the invention. The present disclosure is to be considered as an exemplification of the principles of the invention and is not intended to limit the broad aspect of the invention to the embodiments illustrated.

Figure 4:
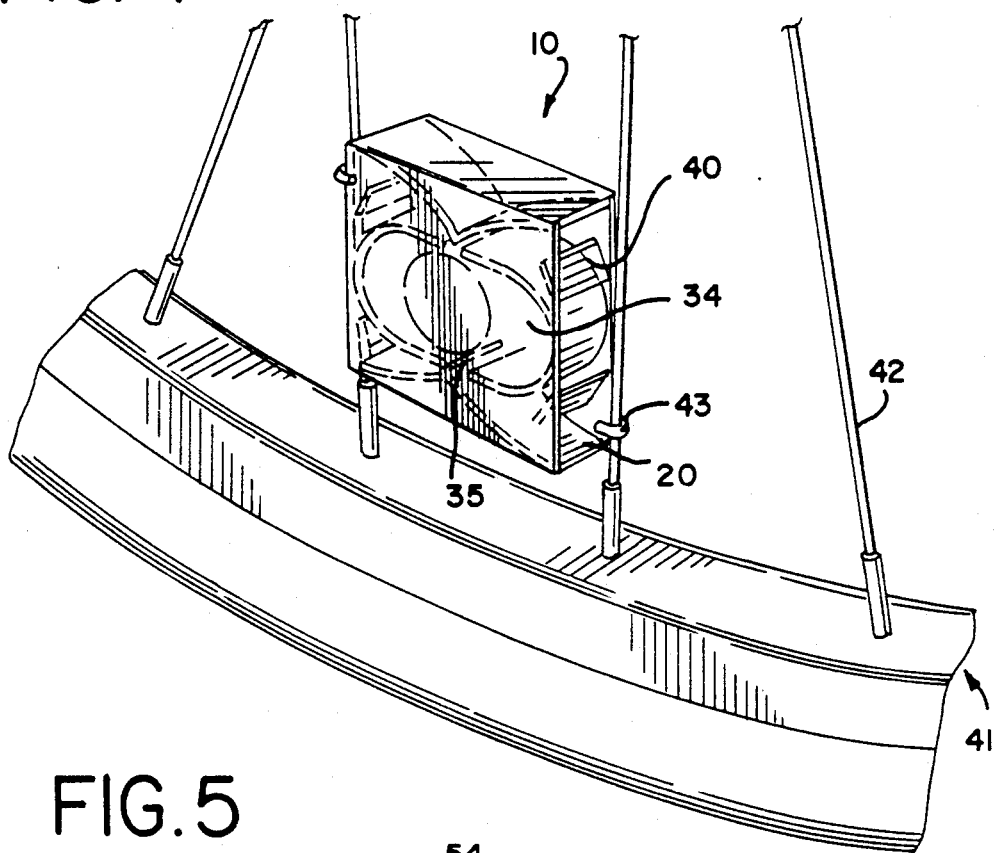
FIG. 4 shows the present invention mounted on a bicycle wheel.
Figure 5:
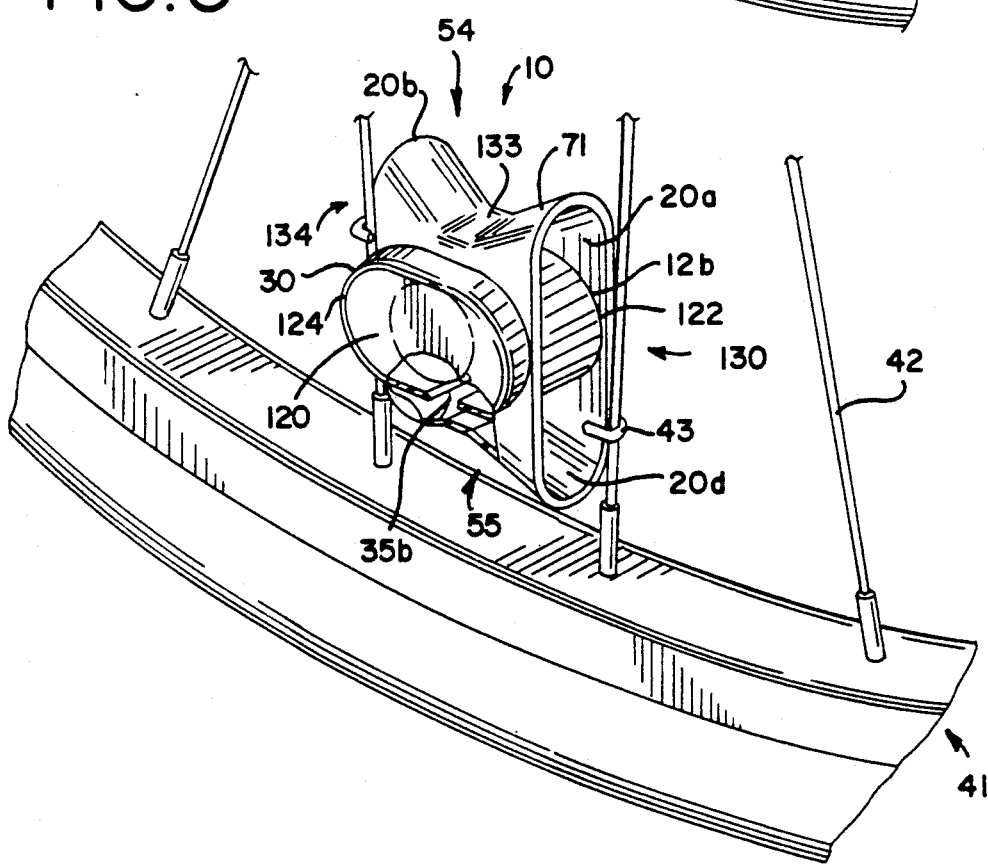
FIG. 5 shows another embodiment of the present invention mounted on a bicycle wheel.

FIG. 1 discloses a whistle 10 having first and second plates 12 and 14 in parallel spaced relation each having opposed outer edges 16, and 18. A portion of plate 12 is cutaway to show four wind scoops 20, the wind scoops defining a first and second wind tunnel 21 and 22, the wind tunnels 21 and 22 being parallel to one another and in vertical spaced relation a generally oval-shaped housing 30 having a wall 31 with an outer 32 and inner surface 33, the housing 30 defines a resonance chamber 34, a pair of whistle elements 35 on the housing 30, and four struts 40 extending between the first and second plates 12, and 14. In general, the whistle 10 is attached to a bicycle wheel 41 having spokes 42 with attachment member 43 so that when the bicycle wheel 41 rotates the wind scoops 20 direct air through the whistle elements 35 and into the resonance chamber 34 where the air resonates at a frequency audible to a human ear. (FIGS. 4 and 5).

In particular, whistle elements 35a and 35b, respectively, comprise first and second air slots 50, and 52 on an upper 54 and lower 55 portion of the housing 30. Preferably the edges 56 along the slots 50, and 52, inwardly taper 57 from the outer edge 32 of the housing wall 31 to the inner edge 33, so that slots 50 and 52 are generally V-shaped.

Figure 3:
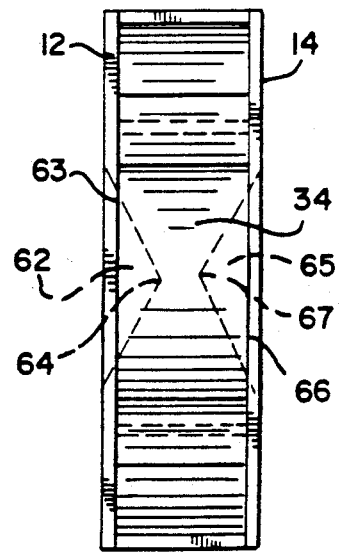
FIG. 3 shows a side view of FIG. 1.

FIG. 3 shows that the resonance chamber 34 includes a first cone 62 having a base 63 and an apex 64. The first cone base 62 is attached to the first plate 12 and has the first cone apex 64 extending into the resonance chamber 34. Similarly, a second cone 65 has a base 66 and an apex 67. The second cone base 66 is attached to the second plate 14, and the second cone apex 67 extends from the second plate 14 into the resonance chamber 34 opposite the first cone apex 64.

Figure 2:
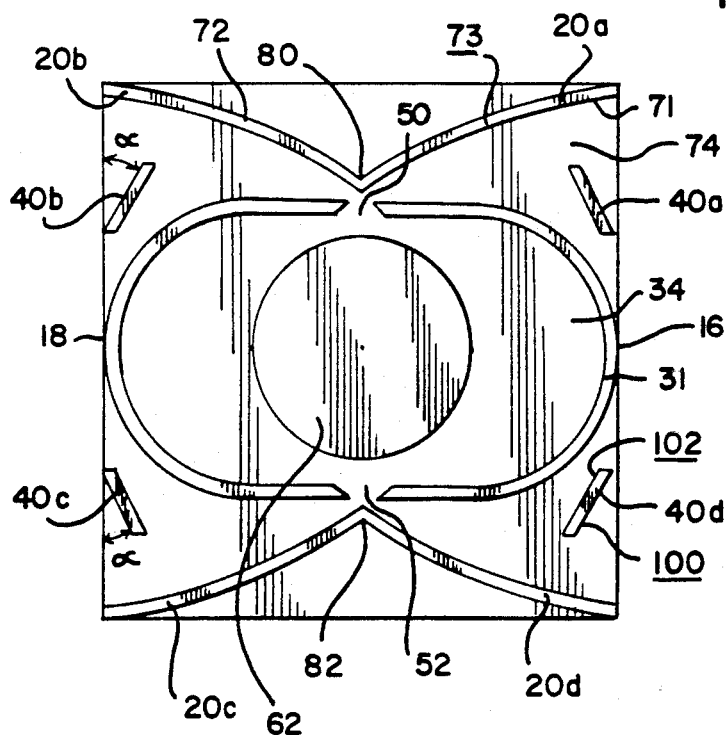
FIG. 2 show a front view of FIG. 1.

FIG. 2 shows that each wind scoop 20a–20d have an outer 71 and inner 72 edge and a wind directing surface 73. Surface 73 curves from its outer edge 71 to its inner edge 72 toward the resonance chamber 34 thereby defining a passage 74 between the wind scoop 20 and the housing wall 31 of the resonance chamber 34 that narrows from the outer edge 71 to the inner edge 72 of the wind scoops 20. The wind directing surface 73 could also be linear, slanting from the outer edge 71 to the inner edge 72, instead of being arcuate.

The inner edges 72 of wind scoops 20a and 20b abut one another to define a first apex 80. Likewise, on the opposite side of the resonance chamber 34, the inner edges 72 of wind scoops 20c and 20d abut one another to define an second apex 82. The first apex 80 is proximate the first V-shaped air slot 50, and the second apex 82 is proximate the second V-shaped air slot 52.

Struts 40a–40d each have a first 100 and second 102 lateral surface. Strut 40a is located proximate the outer edge 71 of wind scoop 20a and forms an acute angle α between lateral surface 100 and outer edge 16 of the plates 12, and 14. Similarly, strut 40b is located near the outer edge 71 of the wind scoop 20b and forms an angle α with edge 18 of plates 12 and 14; and strut 40c is located proximate the outer edge 71 of wind scoop 20c, and forms an angle α with edge 18 of plates 12 and 14, and finally strut 40d is located proximate the outer edge 71 of wind scoop 20d, and forms an angle α with edge 16 of plates 12 and 14.

The struts 40 moderate the air flowing into passage 74 to provide a continuous flow of air into the whistle elements 35. If bicycle wheel 41 rotates slowly, struts 40 increase the flow of air into the passages 74 and into the whistle elements 35. If the bicycle wheel 41 rotates quickly, the struts 40 direct the flow of air away from the whistle elements 35.

FIG. 5 discloses another embodiment of the present invention. Whistle 10 has a generally oval shaped cylindrical housing 30 having first and second end caps 120, and 122 at lateral edges 124 and 126 of the housing respectively. Housing 30 also has the four wind scoops 20a–20d (20c cutaway) attached to the outside of the housing 30.

The wind scoop 20a is attached to a first end 130 of the upper portion 54 of housing 30. Wind scoop 20b is attached to a second end 134 of the upper housing portion 54. The inner edges 71 of both wind scoops 20a and 20b terminate at opposite ends of a first linear portion 133 proximate the first whistle element 35a (not shown).

Similarly, wind scoop 20c (cutaway) is attached to the second end 134 of the lower housing portion 55, and wind scoop 20d is attached to the first end 130 of the lower housing portion 55. The inner edges 71 of wind scoops 20c and 20d terminate at opposite ends of a second linear portion 137 (cutaway) proximate the second whistle element 35b.

Preferably the outer edge 71 of the wind scoops 20 have a greater surface area than the inner edge 72 to concentrate the flow of air into the whistle elements 35.

To operate the whistle 10, the whistle 10 is attached to the spokes 42 of the bicycle tire 41 with the attachment member 43 of the whistle 10. The whistle 10 may be attached to the tire 41 with either wind scoops 20a and 20d facing forward, or with wind scoops 20b and 20c facing forward i.e., the whistle 10 is reversible.

Further, the whistle is a double whistle. Assuming that wind scoops 20a and 20d are facing forward, a bicycle tire 41 rotates, wind is guided through both passages 74a and 74d by wind scoops 20a and 20d into the whistle elements 35a and 35b where the flow of air is split by the tapered edges 57 causing the air to resonate inside the resonance chamber 34 at an audible frequency. Therefore, two whistle elements 35a and 35b simultaneously cause air to resonate within the same resonance chamber 34.

Finally, the whistle is a double reversible whistle. In addition to being a double whistle in a first direction using wind scoops 20a and 20d, it is a double whistle in a second direction opposite the first direction using scoops 20b and 20c.

While the specific embodiments have been illustrated and described, numerous modifications come to mind without significantly departing from the spirit of the invention and the scope of protection is only limited by the scope of the accompanying claims.

We claim:
1. A double reversible whistle:
a housing having upper and lower portions, each portion having a first and second end, the housing defining a resonance chamber;
a first whistle element on the upper housing portion;
a second whistle element on the lower housing portion;
a first wind scoop on the first end of the upper housing portion, the first wind scoop having a wind directing surface in wind communication with the first whistle element;
a second wind scoop on the second end of the upper housing portion, the second wind scoop having a wind directing surface in wind communication with the first whistle element;
a third wind scoop on the second end of the lower housing portion, the third wind scoop having a wind directing surface in wind communication with the second whistle element;
a fourth wind scoop on the first end of the lower housing portion, the fourth wind scoop having a wind directing surface in wind communication with the second whistle element.

2. A whistle comprising:
a wire-spoked wheel;
a housing having an outer and inner surface and upper and lower portions, each housing portion having a first and second end, the housing defining a resonance chamber;
a first whistle element on the upper housing portion;
a second whistle element on the lower housing portion;
a first wind scoop on the first end of the upper housing portion, the first wind scoop having a wind directing surface in wind communication with the first whistle element;
a second wind scoop on the second end of the upper housing portion, the second wind scoop having a wind directing surface in wind communication with the first whistle element;
a third wind scoop on the second end of the lower housing portion, the third wind scoop having a wind directing surface in wind communication with the second whistle element;
a fourth wind scoop on the first end of the lower housing portion, the fourth wind scoop having a wind directing surface in wind communication with the second whistle element; and,
means for attaching the whistle to the wheel.

3. The whistle of claim 2, wherein the housing comprises:
a generally oval-shaped cylindrical wall having first and second ends and an outer and inner surface;
a pair of end caps, one end cap attached to each of the first and second ends of the oval shaped wall.

4. The whistle of claim 3, wherein the housing includes:
a first cone having a first cone base and a first cone apex, the first cone base being attached to an inner surface of the end cap at the first end of the cylindrical wall and the first cone apex extending into the resonance chamber;
a second cone having a second cone base and a second cone apex, the second cone base being attached to an inner surface of the end cap at the second end of the cylindrical wall, the second cone apex extending into the resonance chamber opposite the first cone apex.

5. The whistle of claim 2, wherein the wind directing surface of the wind scoops comprises:
a generally arcuate surface.

6. The whistle of claim 2, wherein the wind directing surface comprises:
a generally linear surface.

7. The whistle of claims 5 or 6 wherein the wind directing surface includes:
a strut proximate the arcuate surface.

8. The whistle of claim 2, wherein the first whistle element comprises:
a latitudinally extending slot in the upper housing portion intermediate the first and second housing ends, the slot having inwardly tapering edges from the outer housing surface to the inner housing surface defining a generally V-shaped opening to the resonance chamber.

9. The whistle of claim 2, wherein the second whistle element comprises:

a latitudinally extending slot in the lower housing portion intermediate the first and second housing ends, the slot having inwardly tapering edges from the outer housing surface to the inner housing surface defining a generally V-shaped opening to the resonance chamber.

10. A whistle comprising:

a wind tunnel having wind scoops at opposite ends, the wind scoops having wind directing surfaces;

a resonance chamber having a generally oval shaped cylindrical wall having first and second ends;

a pair of end caps, one end cap attached to each of the first and second ends of the oval shaped cylindrical wall;

a first cone having a first cone base and a first cone apex, the first cone base being attached to an inner surface of the end cap at the first end of the oval shaped wall, and the first cone apex extending into the resonance chamber; and, a second cone having a second cone base and a second cone apex, the second cone base being attached to an inner surface of the end cap at the second end of the oval wall, the second cone apex extending into the resonance chamber opposite the first cone apex; and, a whistle element on the resonance chamber in wind communication with the wind directing surfaces of both wind scoops.

11. A whistle comprising:

a first wind tunnel having wind scoops at opposite ends, each wind scoop having wind directing surfaces;

a second wind tunnel parallel to and in vertical spaced relation to the first wind tunnel, the second wind tunnel having wind scoops at opposite ends, the wind scoops having wind directing surfaces; and, a resonance chamber disposed between the first and second wind tunnels, the resonance chamber having a first and second whistle element, the first whistle element being at an intermediate portion of the first wind tunnel and in wind communication with the wind directing surfaces of the wind scoops of the first wind tunnel, and the second whistle element being at an intermediate portion of the second wind tunnel and in wind communication with the wind directing surfaces of the wind scoops of the second wind tunnel.

12. The whistle of claim 11 wherein the resonance chamber includes:

a generally oval shaped cylindrical wall having first and second ends; and, a pair of end caps, one end cap attached to each of the first and second ends of the oval shaped cylindrical wall.

13. The whistle of claim 12 wherein the resonance chamber includes:

a first cone having a first cone base and a first cone apex, the first cone base being attached to an inner surface of the end cap of the oval shaped wall, and the first cone apex extending into the resonance chamber;

a second cone having a second cone base and a second cone apex, the second cone base being attached to an inner surface of the end cap at the second end of the oval wall, the second cone apex extending into the resonance chamber opposite the first cone apex.

14. The whistle of claim 11 wherein the wind directing surface of the wind scoops comprises:

a generally arcuate surface.

15. The whistle of claim 11 wherein the wind directing surface of the wind scoops comprises:

a generally linear surface.

* * * * *